（12） United States Patent
Maezawa

(10) Patent No.: US 9,971,552 B2
(45) Date of Patent: May 15, 2018

(54) INFORMATION PROCESSING SYSTEM AND INFORMATION PROCESSING METHOD

(71) Applicant: FUJI XEROX CO., LTD., Tokyo (JP)

(72) Inventor: Toshiyuki Maezawa, Kanagawa (JP)

(73) Assignee: FUJII XEROX CO., LTD., Tokyo (JP)

( * ) Notice: Subject to any disclaimer, the term of this patent is extended or adjusted under 35 U.S.C. 154(b) by 160 days.

(21) Appl. No.: 15/003,412

(22) Filed: Jan. 21, 2016

(65) Prior Publication Data
US 2017/0060497 A1 Mar. 2, 2017

(30) Foreign Application Priority Data

Aug. 26, 2015 (JP) .................................. 2015-166711

(51) Int. Cl.
H04L 1/00 (2006.01)
G06F 3/12 (2006.01)
G06F 21/56 (2013.01)
G06F 21/64 (2013.01)
G06K 15/00 (2006.01)

(52) U.S. Cl.
CPC .......... *G06F 3/1225* (2013.01); *G06F 21/567* (2013.01); *G06F 21/645* (2013.01); *G06K 15/005* (2013.01)

(58) Field of Classification Search
CPC .... G06F 21/567; G06F 21/645; G06F 3/1225; G06K 15/005
See application file for complete search history.

(56) References Cited

U.S. PATENT DOCUMENTS 8,001,603 B1 * 8/2011 Kennedy ............... G06F 21/563
713/165
8,572,368 B1 * 10/2013 Deacon .................. G06F 21/64
713/158

(Continued)

FOREIGN PATENT DOCUMENTS

EP 1132799 A2 9/2001
EP 1710724 A2 10/2006
JP 2014-179034 A 9/2014

OTHER PUBLICATIONS

Communication dated Jan. 5, 2017, from the European Patent Office in counterpart European Application No. 16159682.0.

*Primary Examiner* — Joseph P Hirl
*Assistant Examiner* — Sayed Aresh Beheshti Shirazi
(74) *Attorney, Agent, or Firm* — Sughrue Mion, PLLC

(57) ABSTRACT

An information processing system includes a first apparatus and a second apparatus. The first apparatus includes a first transmission unit that transmits, to the second apparatus, feature information for generating an electronic signature that is added to a program; a first reception unit that receives an electronic signature transmitted from the second apparatus in accordance with the feature information transmitted from the first transmission unit; and a first addition unit that adds the electronic signature received by the first reception unit to the program. The second apparatus includes a second reception unit that receives the feature information transmitted from the first transmission unit; a generation unit that generates an electronic signature from the feature information received by the second reception unit; and a second transmission unit that transmits the electronic signature generated by the generation unit to the first apparatus.

5 Claims, 11 Drawing Sheets

(56) References Cited

U.S. PATENT DOCUMENTS

| | | | |
|---|---|---|---|
| 8,935,788 B1 | 1/2015 | Diao et al. | |
| 2001/0025272 A1* | 9/2001 | Mori | G06F 21/31 |
| | | | 705/76 |
| 2006/0100010 A1* | 5/2006 | Gatto | G06F 21/51 |
| | | | 463/29 |
| 2007/0071238 A1* | 3/2007 | Adams | H04L 9/3247 |
| | | | 380/46 |
| 2013/0166899 A1* | 6/2013 | Courtney | G06F 21/53 |
| | | | 713/100 |
| 2014/0215220 A1* | 7/2014 | Kim | G06F 21/50 |
| | | | 713/176 |
| 2014/0282490 A1* | 9/2014 | Shinomiya | G06F 8/61 |
| | | | 717/174 |
| 2015/0324736 A1* | 11/2015 | Sheets | G06Q 10/08 |
| | | | 705/330 |

* cited by examiner

FIG. 3
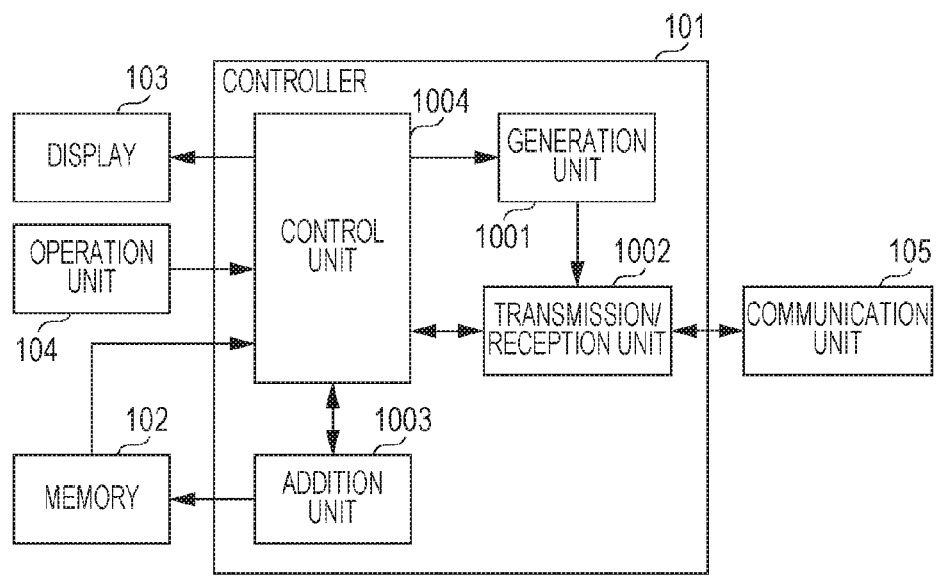
FIG. 4
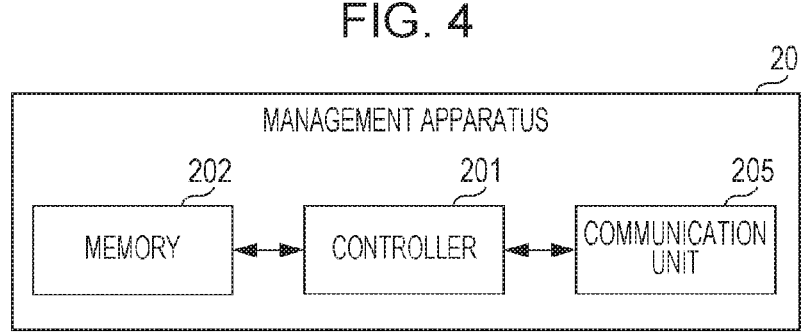
FIG. 5

INFORMATION PROCESSING SYSTEM AND INFORMATION PROCESSING METHOD

CROSS-REFERENCE TO RELATED APPLICATIONS

This application is based on and claims priority under 35 USC 119 from Japanese Patent Application No. 2015-166711 filed Aug. 26, 2015.

BACKGROUND

Technical Field

The present invention relates to an information processing system and an information processing method.

SUMMARY

According to an aspect of the invention, there is provided an information processing system including a first apparatus and a second apparatus. The first apparatus includes a first transmission unit that transmits, to the second apparatus, feature information for generating an electronic signature that is added to a program; a first reception unit that receives an electronic signature transmitted from the second apparatus in accordance with the feature information transmitted from the first transmission unit; and a first addition unit that adds the electronic signature received by the first reception unit to the program. The second apparatus includes a second reception unit that receives the feature information transmitted from the first transmission unit; a generation unit that generates an electronic signature from the feature information received by the second reception unit; and a second transmission unit that transmits the electronic signature generated by the generation unit to the first apparatus.

BRIEF DESCRIPTION OF THE DRAWINGS

An exemplary embodiment of the present invention will be described in detail based on the following figures, wherein:

FIG. 3 is a functional block diagram of the requesting apparatus;

FIG. 4 is a diagram illustrating a hardware configuration of a management apparatus;

FIG. 5 is a diagram illustrating an example of a signature management table;

FIG. 10 is a sequence chart in a case of adding a level-1 electronic signature to a plug-in;

FIG. 11 is a sequence chart in a case of adding a level-2 electronic signature to a plug-in;

FIG. 12 is a sequence chart in a case of adding a level-3 electronic signature to a plug-in;

DETAILED DESCRIPTION

Exemplary Embodiment
Overall Configuration

Figure 1:
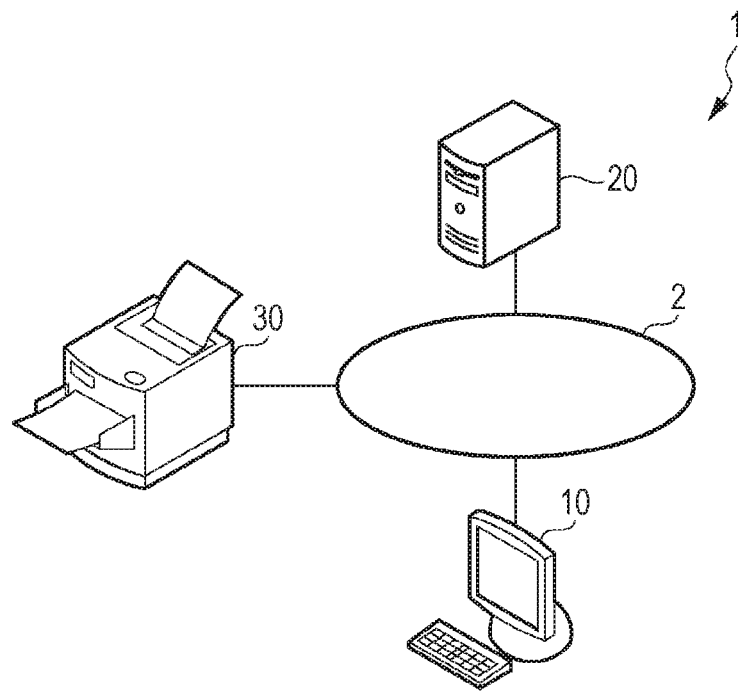
FIG. 1 is a diagram illustrating apparatuses included in an information processing system according to an exemplary embodiment of the present invention.

FIG. 1 is a diagram illustrating apparatuses included in an information processing system 1 according to an exemplary embodiment of the present invention. A communication line 2 is part of a communication network, such as the Internet, a public circuit network, or the like. A requesting apparatus 10, which is an example of a first apparatus according to the exemplary embodiment of the present invention, is a computer apparatus and is placed in a company (first vendor) that develops and sells a plug-in, which is an example of a program, installed on an apparatus manufactured and sold by a second vendor described below. The requesting apparatus 10 is connected to the communication line 2 and performs communication via the communication line 2. Although the requesting apparatus 10 according to this exemplary embodiment is a desktop computer apparatus, the requesting apparatus 10 may be any other computer apparatus that performs data communication, such as a laptop computer apparatus, for example.

A management apparatus 20, which is an example of a second apparatus according to the exemplary embodiment of the present invention, is an apparatus that generates an electronic signature to be added to the plug-in described above. The management apparatus 20 is placed in a company (second vendor) that manufactures and sells the apparatus on which the above-described plug-in is installable. In this exemplary embodiment, the apparatus on which the plug-in is installable is an image forming apparatus 30 having a copy function, a facsimile function, and so on; however, the apparatus may be another apparatus as long as functions of the other apparatus are enhanced when the plug-in is installed. The management apparatus 20 is connected to the communication line 2 and communicates with the requesting apparatus 10 via the communication line 2.

Configuration of Requesting Apparatus 10

Figure 2:
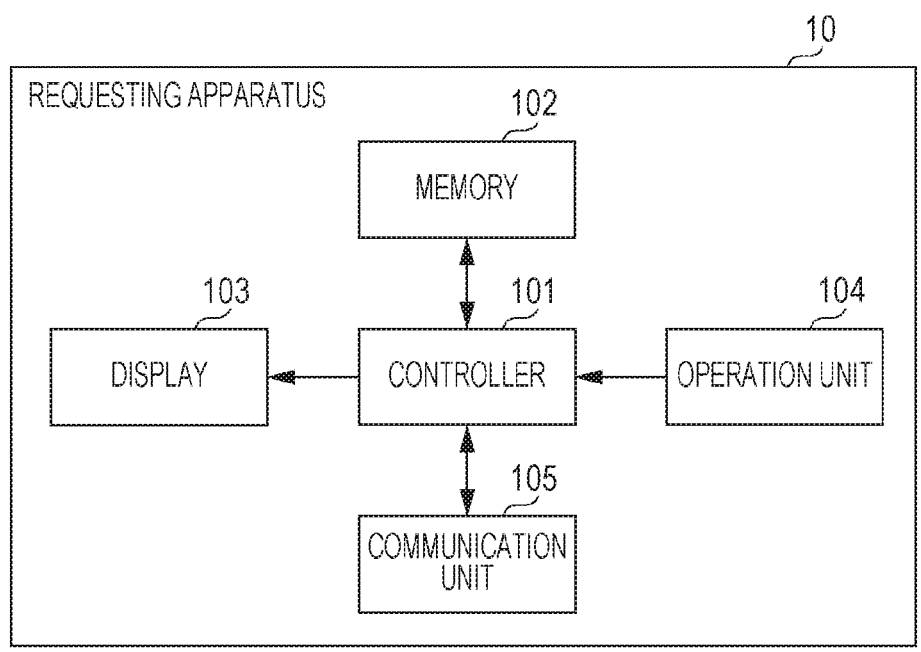
FIG. 2 is a diagram illustrating a hardware configuration of a requesting apparatus.

FIG. 2 is a diagram illustrating an example of a hardware configuration of the requesting apparatus 10. A display 103 includes a display device. The display 103 displays various screens or the like for operating the requesting apparatus 10. An operation unit 104 includes an input device, such as a keyboard or a mouse, for operating the requesting apparatus 10. A communication unit 105 has a function of a communication interface for communication via the communication line 2.

A memory 102 includes a device (hard disk device, for example) that keeps storing data, and stores an operating system program, an application program, the plug-in developed by the first vendor, and so on. In this exemplary embodiment, the memory 102 stores an application program (hereinafter referred to as "signature-adding application") that implements a function of communicating with the management apparatus 20, a function of adding an electronic signature to the plug-in, and so on. A controller 101 includes a central processing unit (CPU) and a random access memory (RAM). The CPU executes the operation system program or the application program stored in the memory 102.

Functional Configuration of Requesting Apparatus 10

FIG. 3 is a functional block diagram illustrating a configuration of functions relating to the exemplary embodiment of the present invention among functions implemented by executing the signature-adding application. A generation unit 1001 generates a hash value of the plug-in stored in the memory 102 using a hash function. The hash value is an example of feature information according to the exemplary embodiment of the present invention. A transmission/reception unit 1002 transmits information to the management apparatus 20. Examples of information that the transmission/reception unit 1002 transmits to the management apparatus 20 include the hash value generated by the generation unit 1001, the plug-in stored in the memory 102, level information indicating the level of an electronic signature that is added to the plug-in, and the result of evaluation of the plug-in using an evaluation script. The transmission/reception unit 1002 receives information transmitted from the management apparatus 20. Examples of information that the transmission/reception unit 1002 receives from the management apparatus 20 include an electronic signature and the plug-in to which an electronic signature is added. The transmission/reception unit 1002 is an example of a first transmission unit and a first reception unit according to the exemplary embodiment of the present invention. An addition unit 1003 adds the electronic signature received by the transmission/reception unit 1002 to the plug-in stored in the memory 102. The addition unit 1003 is an example of a first addition unit according to the exemplary embodiment of the present invention. A control unit 1004 controls the units described above.

Configuration of Management Apparatus 20

FIG. 4 is a block diagram illustrating an example of a hardware configuration of the management apparatus 20. A communication unit 205 functions as a communication interface for performing communication via the communication line 2. A memory 202 includes a device (hard disk device, for example) that keeps storing data, and stores an operating system program and an application program. In this exemplary embodiment, the memory 202 stores an application program for generating an electronic signature. The memory 202 stores a developer number and a signature management table TB1. The developer number is a unique number that the second vendor assigns to the first vendor.

The signature management table TB1 is a table that stores information about generated electronic signatures as a log. FIG. 5 is a diagram illustrating an example of the signature management table TB1. As illustrated, the signature management table TB1 includes a developer number field, a plug-in identifier field, a hash value field, and a level information field. The developer number field stores the developer number assigned to the first vendor that has developed the plug-in to which an electronic signature generated by the management apparatus 20 is added. The plug-in identifier field stores a plug-in identifier for uniquely identifying the plug-in to which an electronic signature generated by the management apparatus 20 is added. The hash value field stores a hash value of the plug-in to which the electronic signature generated by the management apparatus 20 is added. The level information field stores level information indicating the level of the electronic signature.

In this exemplary embodiment, the level of an electronic signature represents the specifics guaranteed by the second vendor for the plug-in. For example, in a case where level information indicates level 1, it is guaranteed that the second vendor has authorized the first vendor as a development company of the plug-in. In a case where level information indicates level 2, it is guaranteed that the plug-in does not perform an unauthorized operation in addition to the guarantee of level 1. In a case where level information indicates level 3, it is guaranteed that the plug-in satisfies quality criteria of the second vendor in addition to the guarantee of level 2.

A controller 201 includes a CPU and a RAM and executes the operating system program and the application program stored in the memory 202.

Functional Configuration of Management Apparatus 20

Figure 6:
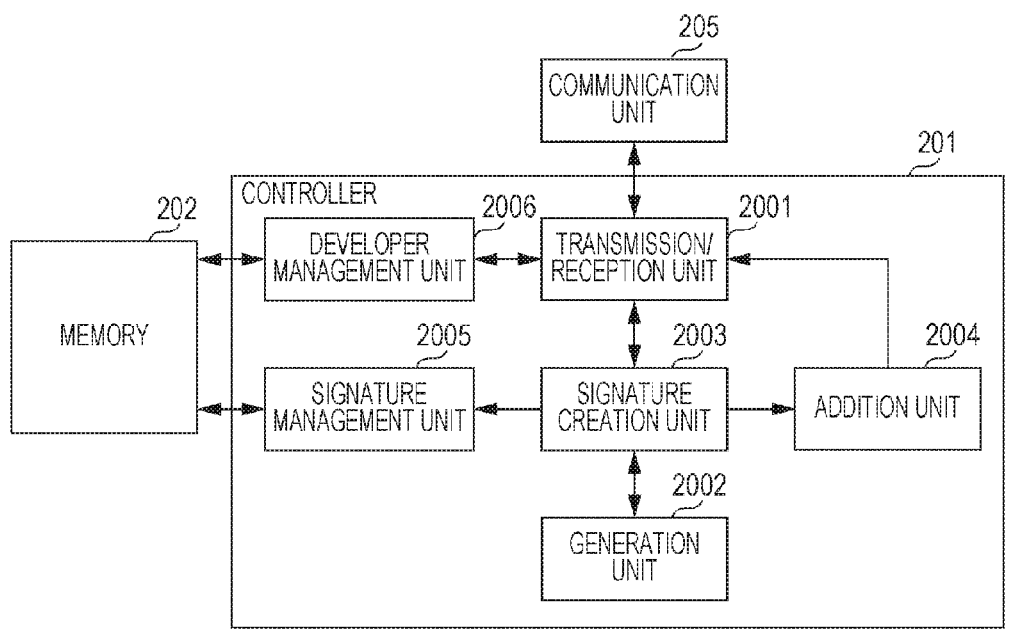
FIG. 6 is a functional block diagram of the management apparatus.

FIG. 6 is a functional block diagram illustrating a configuration of functions relating to the exemplary embodiment of the present invention among functions implemented by the management apparatus 20. A transmission/reception unit 2001 receives various types of information transmitted from the requesting apparatus 10 and transmits various types of information to the requesting apparatus 10. The transmission/reception unit 2001 is an example of a second transmission unit and a second reception unit according to the exemplary embodiment of the present invention. A generation unit 2002 generates a hash value of a plug-in received by the transmission/reception unit 2001 using a hash function. A signature creation unit 2003 creates an electronic signature for the plug-in received by the transmission/reception unit 2001. The signature creation unit 2003 is an example of a generation unit according to the exemplary embodiment of the present invention. An addition unit 2004 adds the electronic signature generated by the signature creation unit 2003 to the plug-in received by the transmission/reception unit 2001. The addition unit 2004 is an example of a second addition unit according to the exemplary embodiment of the present invention. A signature management unit 2005 stores information about the electronic signature created by the signature creation unit 2003 in the signature management table TB1 as a log. The signature management unit 2005 is an example of a storage controller according to the exemplary embodiment of the present invention. A developer management unit 2006 permits the requesting apparatus 10 to use the management apparatus 20 in a case where a developer number that the transmission/reception unit 2001 has received from the requesting apparatus 10 is stored in the memory 202.

Example of Operation in Exemplary Embodiment

Figure 7:
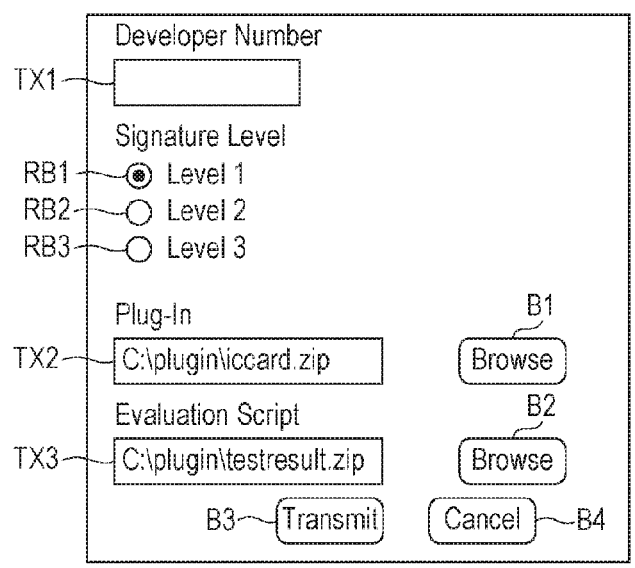
FIG. 7 is a diagram illustrating an example of a screen displayed by the requesting apparatus.
Figure 8:
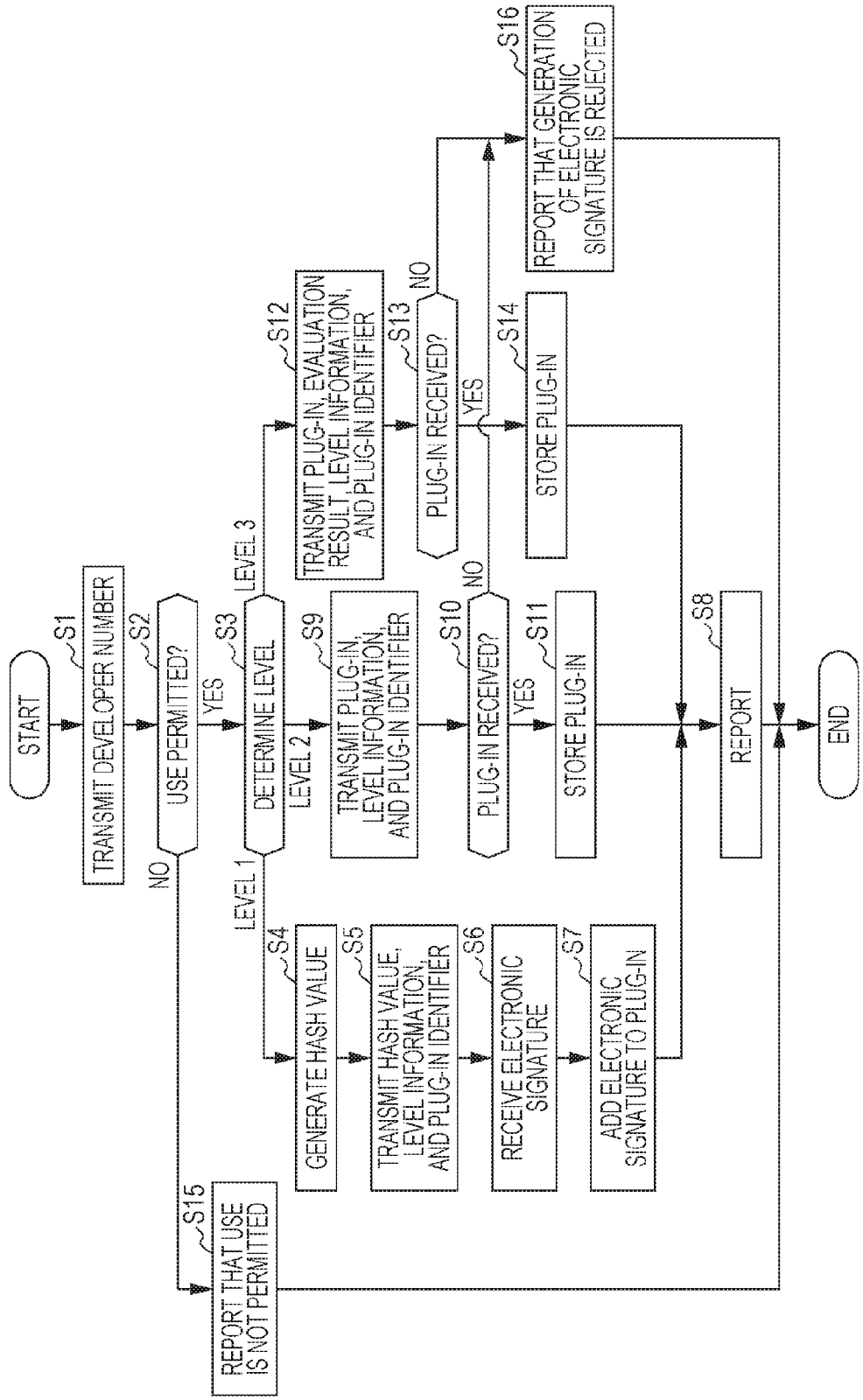
FIG. 8 is a flowchart illustrating a flow of a process performed by a controller.
Figure 9:
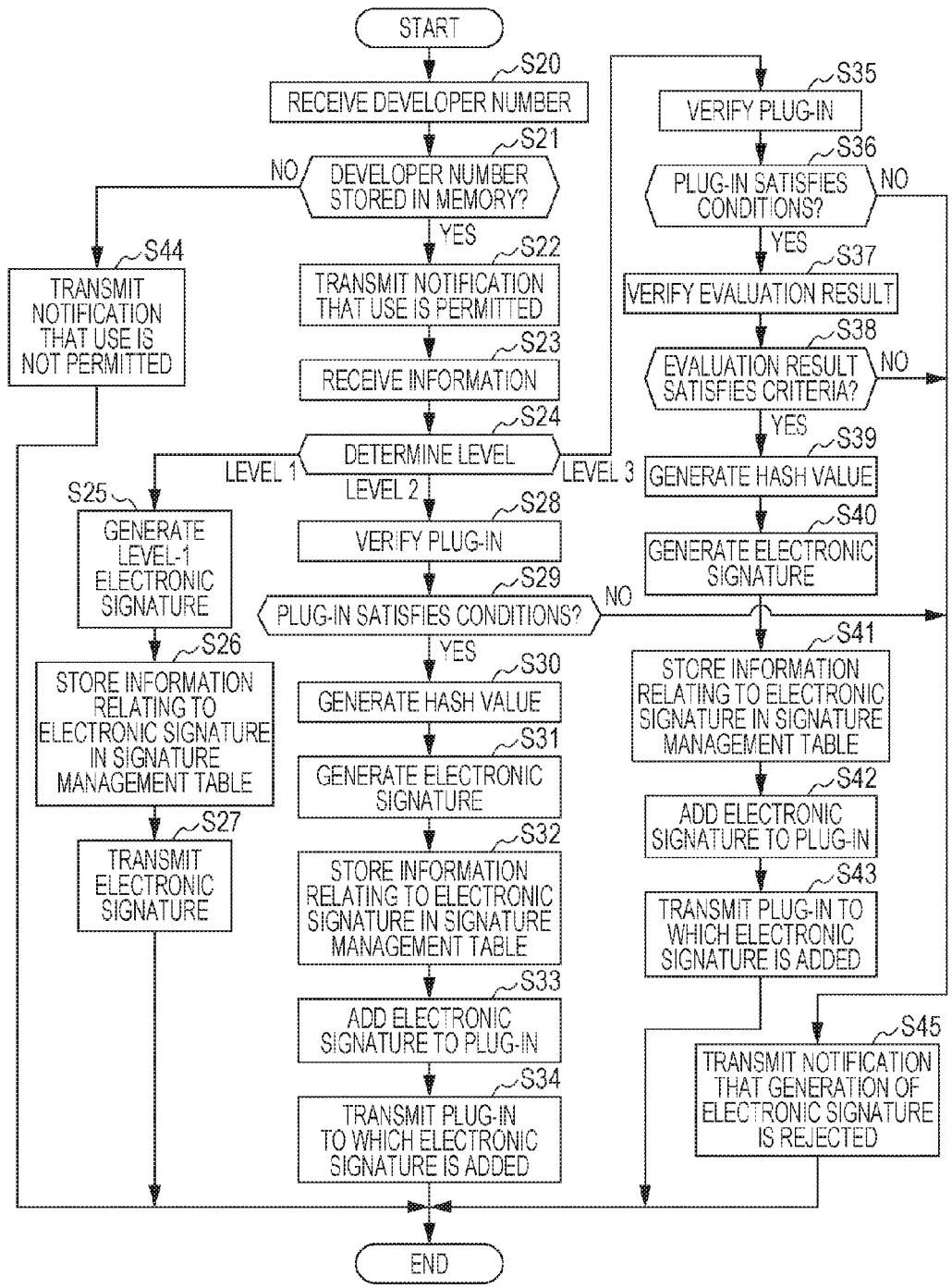
FIG. 9 is a flowchart illustrating a flow of a process performed by another controller.
Figure 10:
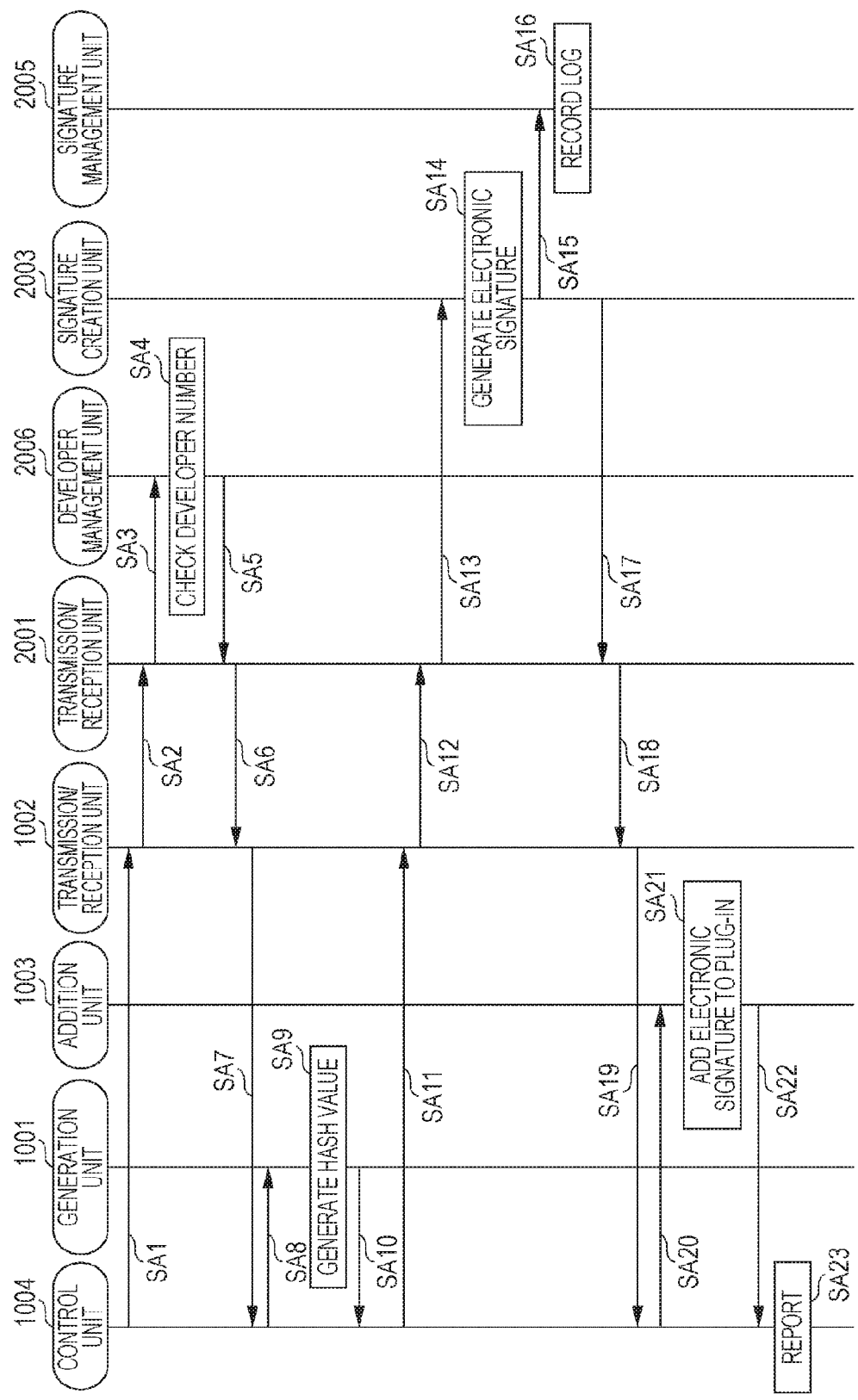

Now, regarding an example of an operation in this exemplary embodiment, an example of an operation in a case of adding a level-1 electronic signature to a plug-in is described first. FIG. 7 is a diagram illustrating an example of a screen displayed on the display 103 of the requesting apparatus 10 that executes the signature-adding application. FIG. 8 is a flowchart illustrating a flow of a process performed by the controller 101. FIG. 9 is a flowchart illustrating a flow of a process performed by the controller 201. FIG. 10 is a sequence chart in the case of adding a level-1 electronic signature to a plug-in.

In the case of adding a level-1 electronic signature to a developed plug-in, an operator of the requesting apparatus 10 selects a level-1 radio button RB1 on the screen illustrated in FIG. 7, inputs a developer number into a text box TX1, and specifies a plug-in to which a level-1 electronic signature is added in a text box TX2. When the operator performs an operation of clicking a transmit button B3 thereafter, the control unit 1004 sends the developer number input into the text box TX1 to the transmission/reception unit 1002 first (step SA1). The transmission/reception unit 1002 transmits the developer number sent from the control unit 1004 to the management apparatus 20 (step S1, step SA2).

The transmission/reception unit 2001 of the management apparatus 20 receives the developer number transmitted by the requesting apparatus 10 (step S20) and sends the received developer number to the developer management unit 2006 (step SA3). The developer management unit 2006 checks if the developer number sent from the transmission/reception unit 2001 is stored in the memory 202 (step S21, step SA4). If the developer number sent from the transmission/reception unit 2001 is stored in the memory 202 (Yes in step S21), the developer management unit 2006 sends to the transmission/reception unit 2001 a notification that use of the management apparatus 20 is permitted (step SA5). The transmission/reception unit 2001 transmits the notification sent from the developer management unit 2006 to the requesting apparatus 10 (step S22, step SA6).

The transmission/reception unit 1002 receives the notification sent from the transmission/reception unit 2001 and sends the received notification to the control unit 1004 (step SA7). If the notification sent from the transmission/reception unit 1002 is a notification that use of the management apparatus 20 is permitted (Yes in step S2), the control unit 1004 determines the electronic signature level specified on the screen illustrated in FIG. 7 (step S3).

If the radio button RB1 is selected on the screen illustrated in FIG. 7 (level 1 in step S3), the control unit 1004 sends the plug-in specified in the text box TX2 to the generation unit 1001 (step SA8). The generation unit 1001 generates a hash value from the plug-in sent from the control unit 1004 (step S4, step SA9) and sends the generated hash value to the control unit 1004 (step SA10). The control unit 1004 sends the hash value sent from the generation unit 1001, level information indicating the electronic signature level (level 1) specified by using the radio button RB1, and a plug-in identifier for uniquely identifying the plug-in to the transmission/reception unit 1002 (step SA11). The transmission/reception unit 1002 transmits the hash value, level information, and plug-in identifier sent from the control unit 1004 to the management apparatus 20 (step S5, step SA12).

The transmission/reception unit 2001 receives the hash value, level information, and plug-in identifier transmitted by the requesting apparatus 10 (step S23) and determines the received level information (step S24). If the received level information indicates level 1, the transmission/reception unit 2001 sends the received hash value, level information, and plug-in identifier to the signature creation unit 2003 (step SA13). If the level information sent from the transmission/reception unit 2001 indicates level 1 (level 1 in step S24), the signature creation unit 2003 encrypts the hash value and level information sent from the transmission/reception unit 2001 using a signature generation key (private key) to thereby generate a level-1 electronic signature (step S25, step SA14).

Next, the signature creation unit 2003 sends the developer number received by the transmission/reception unit 2001 in step SA2 and the plug-in identifier, hash value, and level information sent from the transmission/reception unit 2001 to the signature management unit 2005 (step SA15). The signature management unit 2005 records the developer number, plug-in identifier, hash value, and level information sent from the signature creation unit 2003 to the signature management table TB1 in the memory 202 in association with one another as a log (step S26, step SA16). The signature creation unit 2003 sends the generated electronic signature to the transmission/reception unit 2001 (step SA17). The transmission/reception unit 2001 transmits the electronic signature sent from the signature creation unit 2003 to the requesting apparatus 10 (step S27, step SA18).

The transmission/reception unit 1002 receives the electronic signature sent from the transmission/reception unit 2001 (step S6) and sends the received electronic signature to the control unit 1004 (step SA19). The control unit 1004 sends the electronic signature sent from the transmission/reception unit 1002 to the addition unit 1003 (step SA20). The addition unit 1003 adds the electronic signature sent from the control unit 1004 to the plug-in specified in the text box TX2 (step S7, step SA21). When the addition unit 1003 creates the plug-in to which the electronic signature is added, the addition unit 1003 sends to the control unit 1004 a notification that generation of the plug-in to which the electronic signature is added is completed (step SA22). When the control unit 1004 receives the notification sent from the addition unit 1003, the control unit 1004 reports on the display 103 that generation of the plug-in to which the electronic signature is added is completed (step S8, step SA23).

Figure 11:
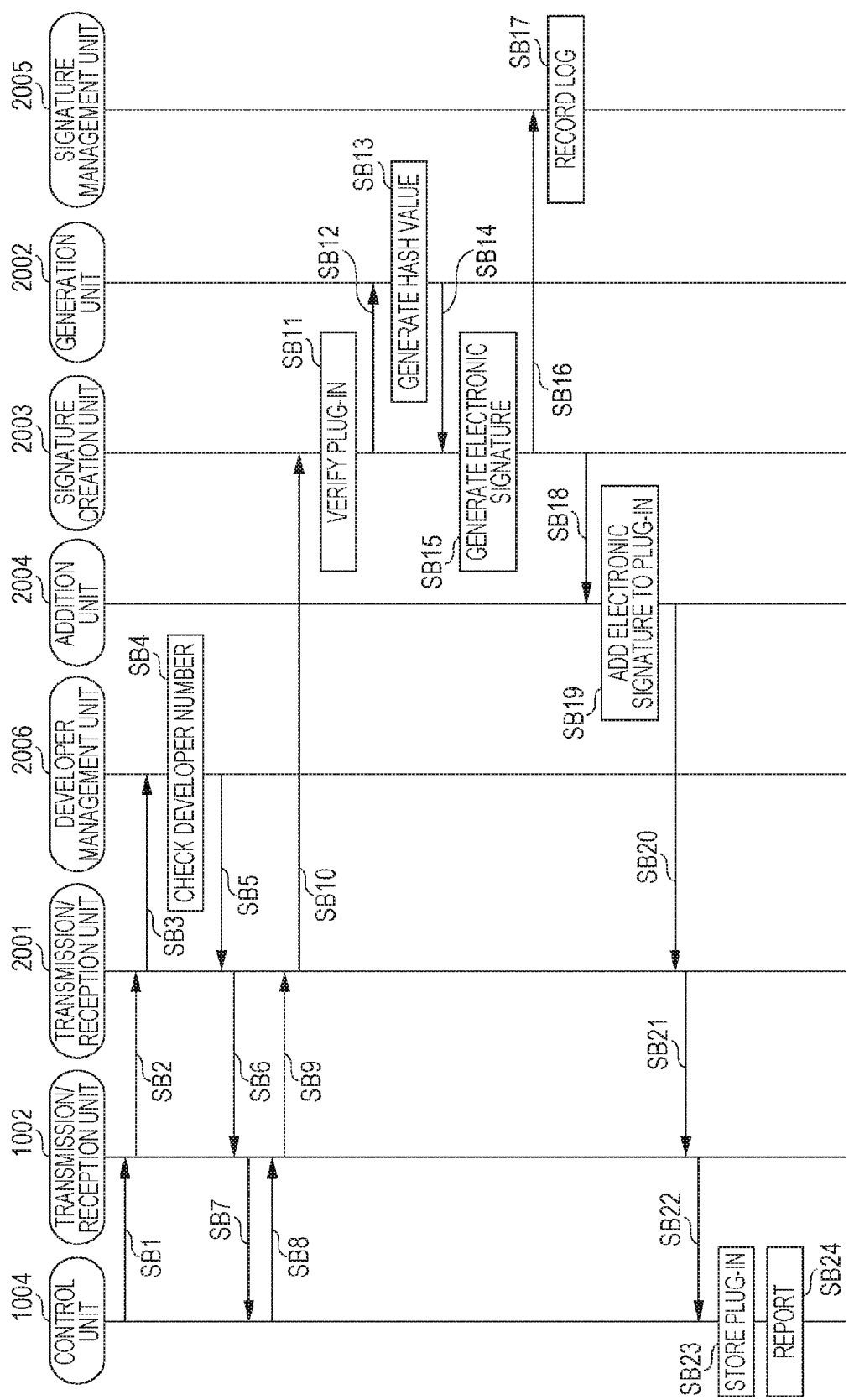

Now, an example of an operation in a case of adding a level-2 electronic signature to a plug-in is described. FIG. 11 is a sequence chart in the case of adding a level-2 electronic signature to a plug-in.

In the case of adding a level-2 electronic signature to a developed plug-in, the operator of the requesting apparatus 10 selects a level-2 radio button RB2 on the screen illustrated in FIG. 7, inputs a developer number into the text box TX1, and specifies a plug-in to which a level-2 electronic signature is added in the text box TX2. When the operator performs an operation of clicking the transmit button B3 thereafter, the control unit 1004 sends the developer number input into the text box TX1 to the transmission/reception unit 1002 first (step SB1). The transmission/reception unit 1002 transmits the developer number sent from the control unit 1004 to the management apparatus 20 (step S1, step SB2).

The transmission/reception unit 2001 of the management apparatus 20 receives the developer number transmitted by the requesting apparatus 10 (step S20) and sends the received developer number to the developer management unit 2006 (step SB3). The developer management unit 2006 checks if the developer number sent from the transmission/reception unit 2001 is stored in the memory 202 (step S21, step SB4). If the developer number sent from the transmission/reception unit 2001 is stored in the memory 202 (Yes in step S21), the developer management unit 2006 sends to the transmission/reception unit 2001 a notification that use of the management apparatus 20 is permitted (step SB5). The transmission/reception unit 2001 transmits the notification sent from the developer management unit 2006 to the requesting apparatus 10 (step S22, step SB6).

The transmission/reception unit 1002 receives the notification sent from the transmission/reception unit 2001 and sends the received notification to the control unit 1004 (step SB7). If the notification sent from the transmission/reception unit 1002 is a notification that use of the management apparatus 20 is permitted (Yes in step S2), the control unit 1004 determines the electronic signature level specified on the screen illustrated in FIG. 7 (step S3).

If the radio button RB2 is selected on the screen illustrated in FIG. 7 (level 2 in step S3), the control unit 1004 sends the plug-in specified in the text box TX2, level information indicating the electronic signature level (level 2) specified by using the radio button RB2, and a plug-in identifier for uniquely identifying the plug-in to the transmission/reception unit 1002 (step SB8). The transmission/reception unit 1002 transmits the plug-in, level information, and plug-in identifier sent from the control unit 1004 to the management apparatus 20 (step S9, step SB9).

The transmission/reception unit 2001 receives the plug-in, level information, and plug-in identifier transmitted by the requesting apparatus 10 (step S23) and determines the received level information (step S24). If the received level information indicates level 2 (level 2 in step S24), the transmission/reception unit 2001 sends the received plug-in, level information, and plug-in identifier to the signature creation unit 2003 (step SB10).

If the sent level information indicates level 2 (level 2 in step S24), the signature creation unit 2003 verifies the plug-in sent from the transmission/reception unit 2001 (step S28, step SB11). Specifically, the signature creation unit 2003 performs a process of analyzing and verifying the received plug-in by determining whether the plug-in satisfies conditions specified by the second vendor. For example, the second vendor specifies conditions that the image forming apparatus 30 on which a plug-in is installed does not perform an operation of externally transmitting information stored in the image forming apparatus 30 via communication, an operation of changing the configuration of the image forming apparatus 30, or the like, and the signature creation unit 2003 analyzes the plug-in by determining whether the plug-in performs these operations.

If the plug-in is determined to satisfy the specified conditions as a result of verification (Yes in step S29), the signature creation unit 2003 sends the plug-in to the generation unit 2002 (step SB12). The generation unit 2002 generates a hash value of the plug-in sent from the signature creation unit 2003 (step S30, step SB13) and sends the generated hash value to the signature creation unit 2003 (step SB14). If the level information sent from the transmission/reception unit 2001 indicates level 2, the signature creation unit 2003 encrypts the level information and the hash value sent from the generation unit 2002 using the signature generation key (private key) to thereby generate an electronic signature (step S31, step SB15).

Next, the signature creation unit 2003 sends the developer number received by the transmission/reception unit 2001 in step SB2, the plug-in identifier sent from the transmission/reception unit 2001, the hash value sent from the generation unit 2002, and the level information sent from the transmission/reception unit 2001 to the signature management unit 2005 (step SB16). The signature management unit 2005 records the developer number, plug-in identifier, hash value, and level information sent from the signature creation unit 2003 to the signature management table TB1 in the memory 202 in association with one another as a log (step S32, step SB17).

Next, if the level information sent from the transmission/reception unit 2001 indicates level 2, the signature creation unit 2003 sends the plug-in sent from the transmission/reception unit 2001 and the generated electronic signature to the addition unit 2004 (step SB18). When the addition unit 2004 receives the plug-in and electronic signature sent from the signature creation unit 2003, the addition unit 2004 adds the received electronic signature to the received plug-in (step S33, step SB19). Next, the addition unit 2004 sends the plug-in to which the electronic signature is added to the transmission/reception unit 2001 (step SB20). The transmission/reception unit 2001 transmits the plug-in sent form the addition unit 2004 to the requesting apparatus 10 (step S34, step SB21).

The transmission/reception unit 1002 receives the plug-in sent from the transmission/reception unit 2001 and sends the received plug-in to the control unit 1004 (step SB22). When the control unit 1004 receives the plug-in to which the electronic signature is added from the transmission/reception unit 1002 (Yes in step S10), the control unit 1004 stores the plug-in sent from the transmission/reception unit 1002 in the memory 102 (step S11, step SB23) and reports on the display 103 that generation of the plug-in to which the electronic signature is added is completed (step S8, step SB24).

Figure 12:
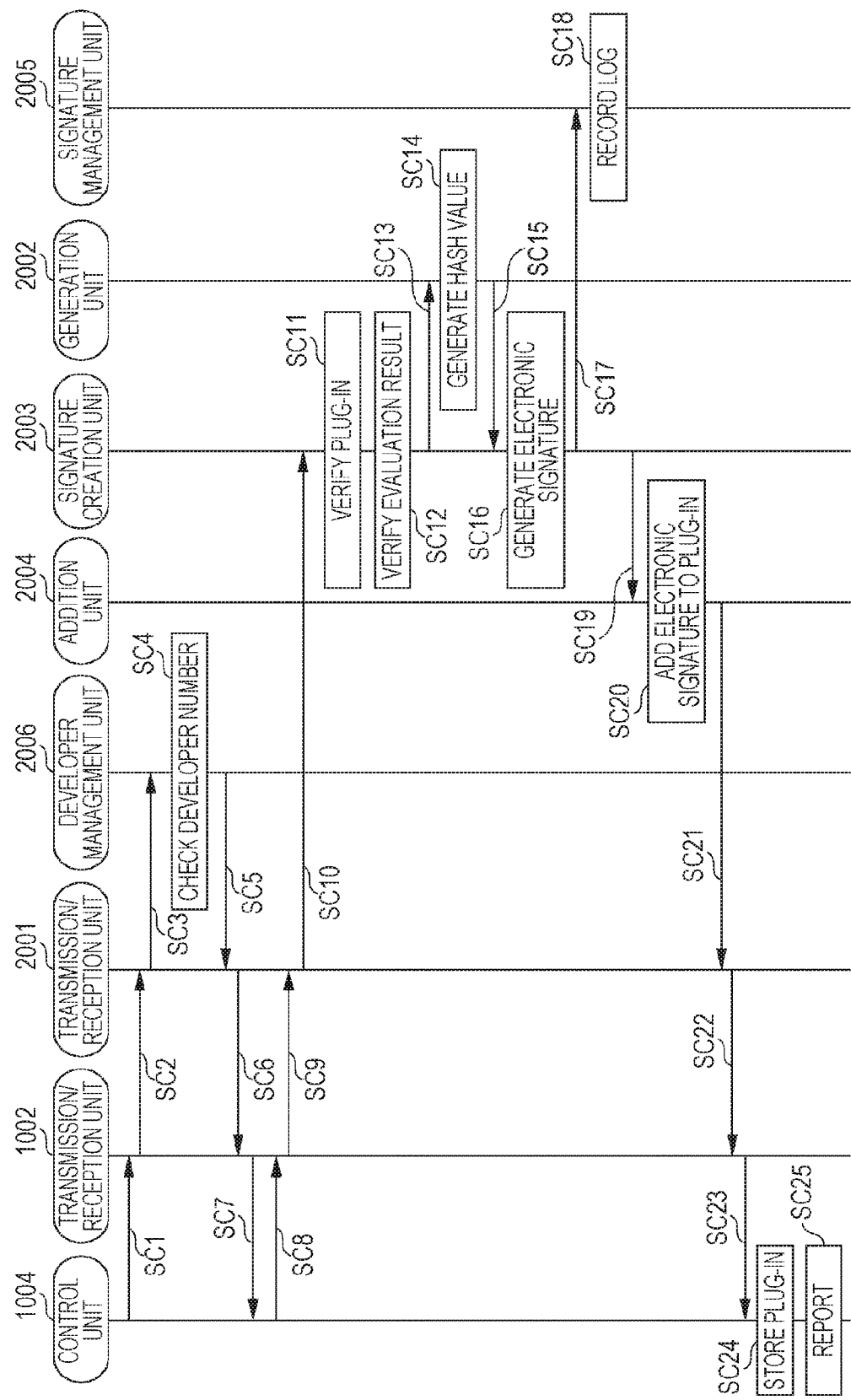

Now, an example of an operation in a case of adding a level-3 electronic signature to a plug-in is described. FIG. 12 is a sequence chart in the case of adding a level-3 electronic signature to a plug-in.

In the case of adding a level-3 electronic signature to a developed plug-in, the operator of the requesting apparatus 10 selects a level-3 radio button RB3 on the screen illustrated in FIG. 7, inputs a developer number into the text box TX1, specifies a plug-in to which a level-3 electronic signature is added in the text box TX2, and specifies the result of evaluation of the plug-in using an evaluation script provided by the second vendor in a text box TX3. When the operator performs an operation of clicking the transmit button B3 thereafter, the control unit 1004 sends the developer number input into the text box TX1 to the transmission/reception unit 1002 first (step SC1). The transmission/reception unit 1002 transmits the developer number sent from the control unit 1004 to the management apparatus 20 (step S1, step SC2).

The transmission/reception unit 2001 of the management apparatus 20 receives the developer number transmitted by the requesting apparatus 10 (step S20) and sends the received developer number to the developer management unit 2006 (step SC3). The developer management unit 2006 checks if the developer number sent from the transmission/reception unit 2001 is stored in the memory 202 (step S21, step SC4). If the developer number sent from the transmission/reception unit 2001 is stored in the memory 202 (Yes in step S21), the developer management unit 2006 sends to the transmission/reception unit 2001 a notification that use of the management apparatus 20 is permitted (step SC5). The transmission/reception unit 2001 transmits the notification sent from the developer management unit 2006 to the requesting apparatus 10 (step S22, step SC6).

The transmission/reception unit 1002 receives the notification sent from the transmission/reception unit 2001 and sends the received notification to the control unit 1004 (step SC7). If the notification sent from the transmission/reception unit 1002 is a notification that use of the management apparatus 20 is permitted (Yes in step S2), the control unit 1004 determines the electronic signature level specified on the screen illustrated in FIG. 7 (step S3).

If the radio button RB3 is selected on the screen illustrated in FIG. 7 (level 3 in step S3), the control unit 1004 sends the plug-in specified in the text box TX2, the result of evaluation specified in the text box TX3, level information indicating the electronic signature level (level 3) specified by using the radio button RB3, and a plug-in identifier for uniquely identifying the plug-in to the transmission/reception unit 1002 (step SC8). The transmission/reception unit 1002 transmits the plug-in, result of evaluation, level information, and plug-in identifier sent from the control unit 1004 to the management apparatus 20 (step S12, step SC9).

The transmission/reception unit 2001 receives the plug-in, result of evaluation, level information, and plug-in identifier transmitted by the requesting apparatus 10 (step S23) and determines the received level information (step S24). If the received level information indicates level 3, the transmission/reception unit 2001 sends the received plug-in, result of evaluation, level information, and plug-in identifier to the signature creation unit 2003 (step SC10).

If the sent level information indicates level 3 (level 3 in step S24), the signature creation unit 2003 verifies the plug-in sent from the transmission/reception unit 2001 (step S35, step SC11). If the plug-in is determined to satisfy the specified conditions as a result of verification (Yes in step S36), the signature creation unit 2003 verifies the result of evaluation sent from the transmission/reception unit 2001 (step S37, step SC12). Specifically, the signature creation unit 2003 verifies whether the content of the result of evaluation satisfies criteria specified in advance by the second vendor.

If the content of the result of evaluation satisfies the criteria specified in advance by the second vendor (Yes in step S38), the signature creation unit 2003 sends the plug-in to the generation unit 2002 (step SC13). The generation unit 2002 generates a hash value of the plug-in sent from the signature creation unit 2003 (step S39, step SC14) and sends the generated hash value to the signature creation unit 2003 (step SC15). If the level information sent from the transmission/reception unit 2001 indicates level 3, the signature creation unit 2003 encrypts the level information and the hash value sent from the generation unit 2002 using the signature generation key (private key) to thereby generate an electronic signature (step S40, step SC16).

Next, the signature creation unit 2003 sends the developer number received by the transmission/reception unit 2001 in step SC2, the plug-in identifier sent from the transmission/reception unit 2001, the hash value sent from the generation unit 2002, and the level information sent from the transmission/reception unit 2001 to the signature management unit 2005 (step SC17). The signature management unit 2005 records the developer number, plug-in identifier, hash value, and level information sent from the signature creation unit 2003 to the signature management table TB1 in the memory 202 in association with one another as a log (step S41, step SC18).

Next, if the level information sent from the transmission/reception unit 2001 indicates level 3, the signature creation unit 2003 sends the plug-in sent from the transmission/reception unit 2001 and the generated electronic signature to the addition unit 2004 (step SC19). When the addition unit 2004 receives the plug-in and electronic signature sent from the signature creation unit 2003, the addition unit 2004 adds the received electronic signature to the received plug-in (step S42, step SC20). Next, the addition unit 2004 sends the plug-in to which the electronic signature is added to the transmission/reception unit 2001 (step SC21). The transmission/reception unit 2001 transmits the plug-in sent form the addition unit 2004 to the requesting apparatus 10 (step S43, step SC22).

The transmission/reception unit 1002 receives the plug-in sent from the transmission/reception unit 2001 and sends the received plug-in to the control unit 1004 (step SC23). When the control unit 1004 receives the plug-in to which the electronic signature is added from the transmission/reception unit 1002 (Yes in step S13), the control unit 1004 stores the plug-in sent from the transmission/reception unit 1002 in the memory 102 (step S14, step SC24) and reports on the display 103 that generation of the plug-in to which the electronic signature is added is completed (step S8, step SC25).

If determination in step S21 results in No or if the developer number sent from the transmission/reception unit 2001 is not stored in the memory 202 (No in step S21), the developer management unit 2006 sends to the transmission/reception unit 2001 a notification that use of the management apparatus 20 is not permitted (step S44). The transmission/reception unit 2001 transmits the notification sent from the developer management unit 2006 to the requesting apparatus 10 (step S44). If the plug-in is determined not to satisfy the conditions as a result of verification of the plug-in (No in step S29, No in step S36) or if the content of the result of evaluation does not satisfy the criteria specified in advance by the second vendor (No in step S38), the signature creation unit 2003 sends to the transmission/reception unit 2001 a notification that generation of an electronic signature is rejected. The transmission/reception unit 2001 transmits the notification to the requesting apparatus 10 (step S45).

When the transmission/reception unit 1002 receives the notification that use of the management apparatus 20 is not permitted (No in step S2), the control unit 1004 reports on the display 103 that use of the management apparatus 20 is not permitted (step S15). When the transmission/reception unit 1002 receives the notification that generation of an electronic signature is rejected (No in step S10, No in step S13), the control unit 1004 reports on the display 103 that generation of an electronic signature is rejected (step S16).

Figure 13:
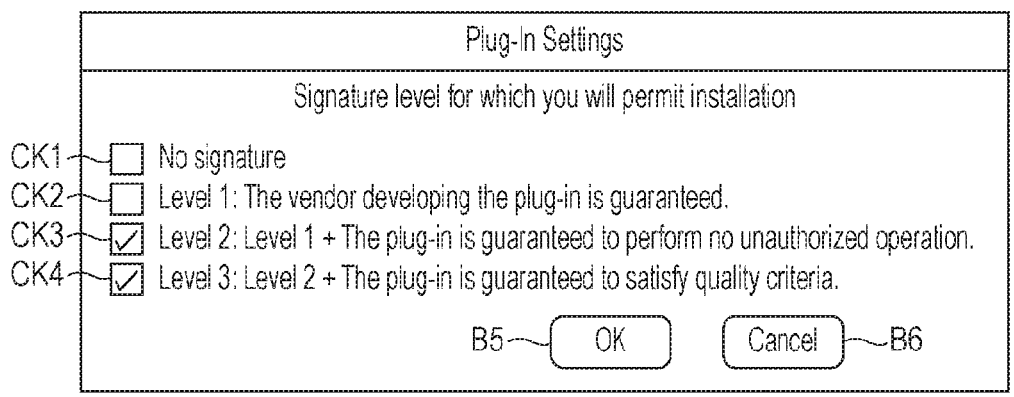
FIG. 13 is a diagram illustrating an example of a screen displayed by an image forming apparatus.

Now, an example of an operation performed when a plug-in is installed on the image forming apparatus 30 is described. In the image forming apparatus 30, an electronic signature level of a plug-in that is permitted to be installed is set. For example, a screen illustrated in FIG. 13 is displayed on a touch panel included in the image forming apparatus 30, on which the user is prompted to select an electronic signature level of a plug-in for which the user permits installation. For example, in a case of permitting installation of a plug-in that is guaranteed to perform no unauthorized operation and prohibiting installation of a plug-in that is not guaranteed to perform no unauthorized operation, the user checks a checkbox CK3 and a checkbox CK4, unchecks a checkbox CK1 and a checkbox CK2, and taps an OK button B5, as illustrated in FIG. 13.

Figure 14:
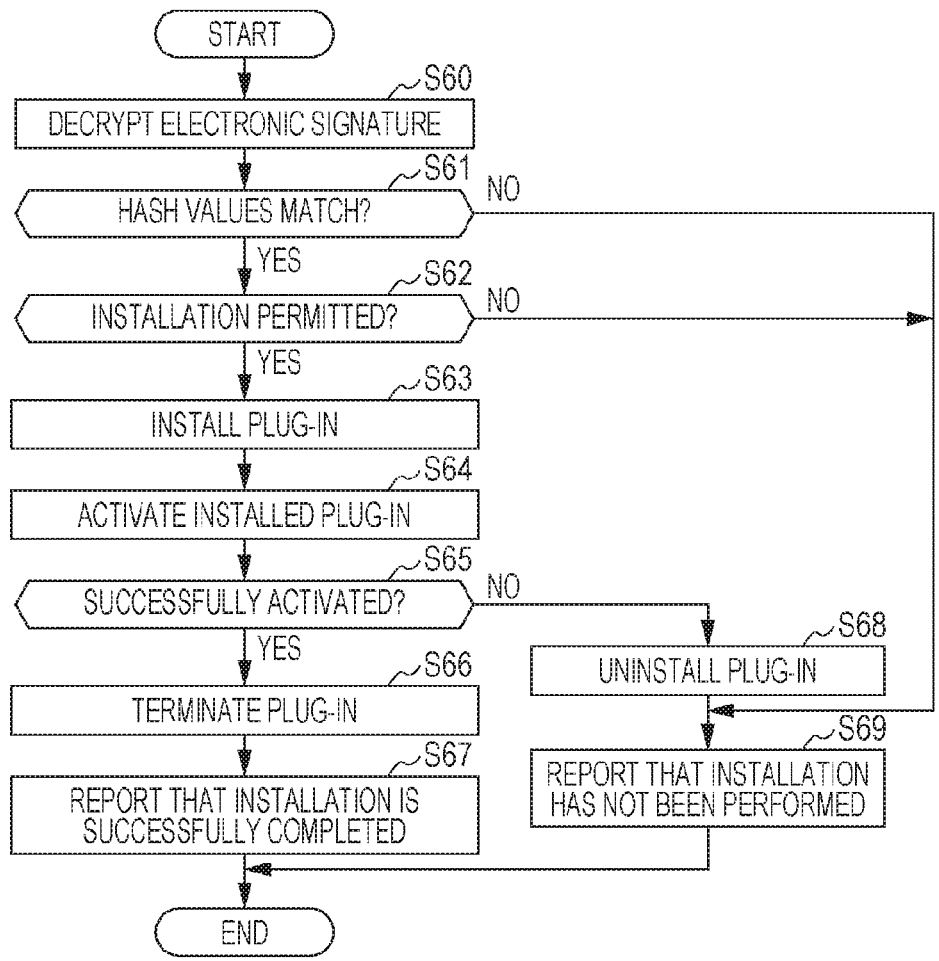
FIG. 14 is a flowchart illustrating a flow of a process performed by the image forming apparatus.

When the user performs an operation for installing a plug-in, the image forming apparatus 30 performs a process illustrated in FIG. 14. Specifically, the image forming apparatus 30 downloads the plug-in in response to the user operation, thereafter decrypts the electronic signature added to the plug-in by using a public key, and obtains the hash value and level information included in the electronic signature (step S60).

Next, the image forming apparatus 30 calculates a hash value of the plug-in and determines whether the calculated hash value matches the hash value obtained as a result of decryption above (step S61). If the hash values match each other, the image forming apparatus 30 compares the electronic signature level of a plug-in for which installation is permitted as a result of setting described above with the level information obtained by decrypting the electronic signature and determines whether installation is permitted (step S62). For example, in a case where installation is permitted for a plug-in to which a level-2 electronic signature or a level-3 electronic signature is added as described above, if the level information obtained as a result of decryption processing described above indicates level 2 or level 3, the image forming apparatus 30 installs the downloaded plug-in (step S63).

When installation of the plug-in is completed, the image forming apparatus 30 activates the installed plug-in (step S64) and determines whether the plug-in is successfully activated (step S65). If the installed plug-in is successfully activated (Yes in step S65), the image forming apparatus 30 terminates the plug-in (step S66) and reports on the touch panel that installation is successfully completed (step S67).

If the hash values do not match each other (No in step S61) or if the electronic signature level of the downloaded plug-in does not correspond to the set level (No in step S62), the image forming apparatus 30 reports on the touch panel that the downloaded plug-in has not been installed (step S69). If the installed plug-in is not successfully activated (No in step S65), the image forming apparatus 30 uninstalls the installed plug-in (step S68) and reports on the touch panel that the downloaded plug-in has not been installed (step S69).

Note that in the image forming apparatus 30, a list of installed plug-ins may be displayed on the touch panel in response to a user operation, and the level of an electronic signature that is added to each plug-in may be indicated in the displayed list.

Modifications

Although an exemplary embodiment of the present invention is described above, exemplary embodiments of the present invention are not limited to the above-described exemplary embodiment and may be implemented in other various forms. For example, the above-described exemplary embodiment may be modified as follows to thereby implement exemplary embodiments of the present invention. Note that any of the above-described exemplary embodiment and the following modifications may be combined.

In the above-described exemplary embodiment, the controller 201 verifies a plug-in and an evaluation result; however, a verifier of the second vendor instead of the controller 201 may verify a plug-in and an evaluation result. In this case, the verifier inputs the result of verification into the management apparatus 20, and the controller 201 performs determination in steps S29, S36, and S38 on the basis of the input verification result.

In the above-described exemplary embodiment, the same signature generation key is used for different electronic signature levels; however, a different pair of a signature generation key and a public key may be used for each level. For example, in a case of generating a level-1 electronic signature, a hash value may be encrypted using a signature generation key corresponding to level 1 to thereby generate an electronic signature. In a case of generating a level-2 electronic signature, a hash value may be encrypted using a signature generation key corresponding to level 2 to thereby generate an electronic signature. In a case of generating a level-3 electronic signature, a hash value may be encrypted using a signature generation key corresponding to level 3 to thereby generate an electronic signature.

The image forming apparatus 30 may obtain public keys that correspond to the respective levels and, when a plug-in is downloaded, attempt to decrypt the electronic signature by using a corresponding one of the public keys that have been obtained. If the electronic signature is successfully decrypted, the image forming apparatus 30 identifies a level that corresponds to the public key used in the successful decryption and determines that the electronic signature of the identified level is added to the plug-in.

Figure 15:
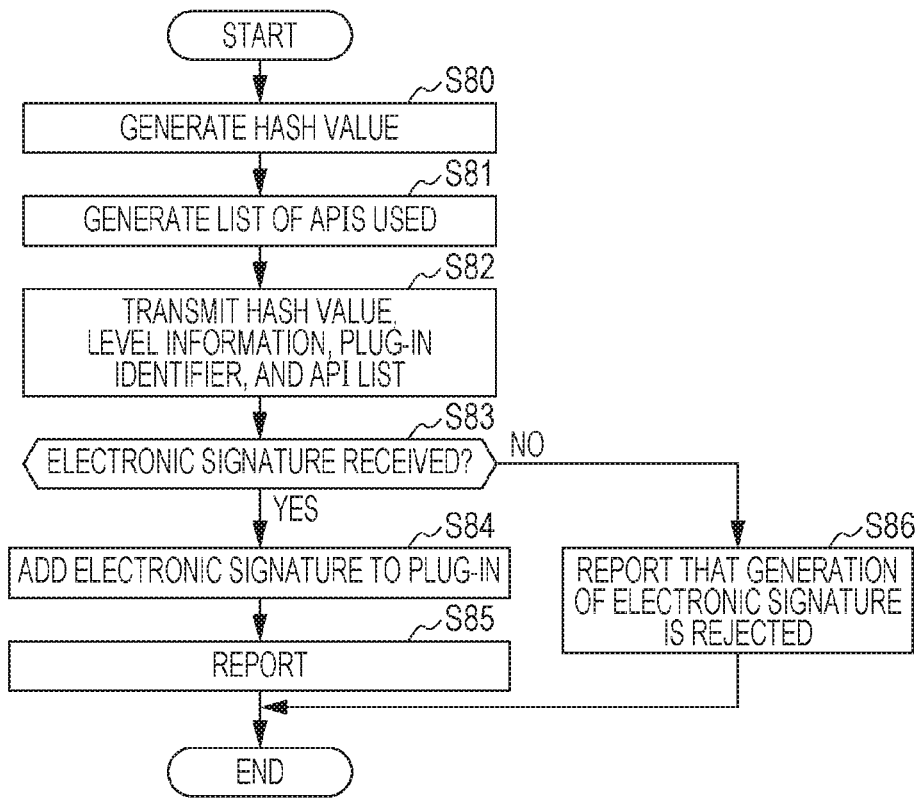
FIG. 15 is a flowchart illustrating a flow of a process performed by the controller according to a modification.
Figure 16:
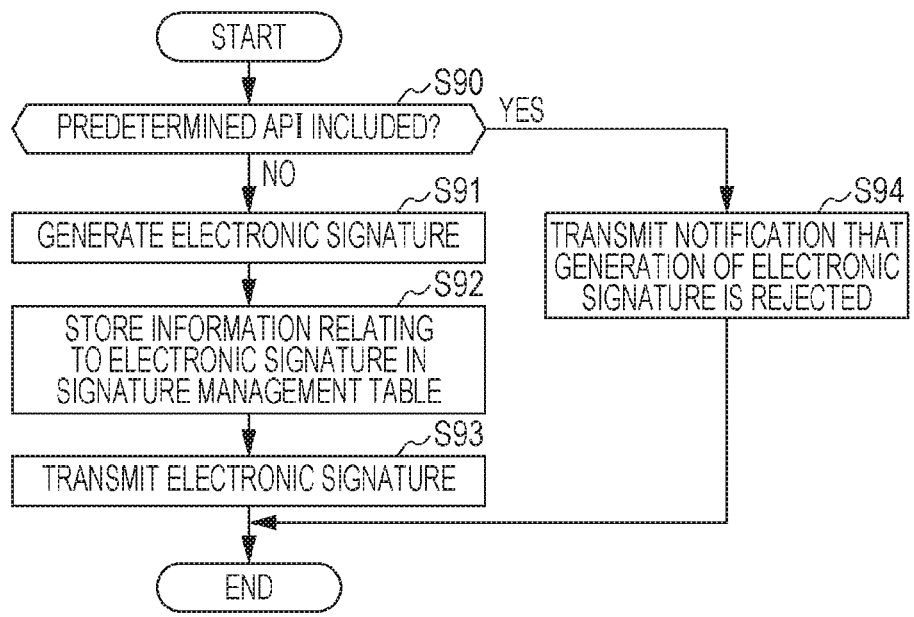
FIG. 16 is a flowchart illustrating a flow of a process performed by the other controller according to a modification.

In exemplary embodiments of the present invention, regarding the electronic signature level, a level between level 1 and level 2 (for example, level 1.5) may be provided. FIG. 15 is a flowchart illustrating a flow of a process after it has been determined in step S3 that the operator of the requesting apparatus 10 sets the electronic signature level to 1.5. FIG. 16 is a flowchart illustrating a flow of a process after it has been determined in step S24 that the electronic signature level is 1.5.

If it is determined in step S3 that the operator of the requesting apparatus 10 sets the electronic signature level to 1.5, the control unit 1004 sends a plug-in specified in the text box TX2 to the generation unit 1001. The generation unit 1001 generates a hash value from the plug-in sent from the control unit 1004 (step S80) and sends the generated hash value to the control unit 1004. Next, the control unit 1004 analyzes the plug-in and generates a list of application programming interfaces (APIs) used by the plug-in (step S81). When generation of the API list is completed, the control unit 1004 sends the hash value sent from the generation unit 1001, level information indicating the electronic signature level (level 1.5) specified by using the radio button RB1, a plug-in identifier for uniquely identifying the plug-in, and the API list to the transmission/reception unit 1002 (step S82, step SA11). The transmission/reception unit 1002 transmits the hash value, level information, plug-in identifier, and API list sent from the control unit 1004 to the management apparatus 20 (step S5, step SA12).

The transmission/reception unit 2001 receives the hash value, level information, plug-in identifier, and API list transmitted by the requesting apparatus 10 and determines the received level information. If the received level information indicates level 1.5, the transmission/reception unit 2001 sends the received hash value, level information, plug-in identifier and API list to the signature creation unit 2003. If the level information sent from the transmission/reception unit 2001 indicates level 1.5, the signature creation unit 2003 determines whether a predetermined API, use of which is prohibited by the second vendor, is included in the API list (step S90).

If a predetermined API, use of which is prohibited by the second vendor, is not included in the API list (No in step S90), the signature creation unit 2003 encrypts the hash value and level information sent from the transmission/reception unit 2001 using the signature generation key (private key) to thereby generate a level-1.5 electronic signature (step S91).

Next, the signature creation unit 2003 sends the developer number received by the transmission/reception unit 2001 in step SA2 and the plug-in identifier, hash value, and level information sent from the transmission/reception unit 2001 to the signature management unit 2005. The signature management unit 2005 records the developer number, plug-in identifier, hash value, and level information sent from the signature creation unit 2003 to the signature management table TB1 in the memory 202 in association with one another as a log (step S92). The signature creation unit 2003 sends the generated electronic signature to the transmission/reception unit 2001. The transmission/reception unit 2001 transmits the electronic signature sent from the signature creation unit 2003 to the requesting apparatus 10 (step S93).

If a predetermined API, use of which is prohibited by the second vendor, is included in the API list (Yes in step S90), the signature creation unit 2003 sends to the transmission/reception unit 2001 a notification that generation of an electronic signature is rejected. The transmission/reception unit 2001 transmits the notification to the requesting apparatus 10 (step S94).

The transmission/reception unit 1002 receives the electronic signature sent from the transmission/reception unit 2001 and sends the received electronic signature to the control unit 1004. When the control unit 1004 receives the electronic signature sent from the transmission/reception unit 1002 (Yes in step S83), the control unit 1004 sends the electronic signature sent from the transmission/reception unit 1002 to the addition unit 1003. The addition unit 1003 adds the electronic signature sent from the control unit 1004 to the plug-in specified in the text box TX2 (step S84). When the addition unit 1003 generates the plug-in to which the electronic signature is added, the addition unit 1003 sends to the control unit 1004 a notification that generation of the plug-in to which the electronic signature is added is completed. When the control unit 1004 receives the notification sent from the addition unit 1003, the control unit 1004 reports on the display 103 that generation of the plug-in to which the electronic signature is added is completed (step S85).

When the transmission/reception unit 2001 receives a notification that generation of an electronic signature is rejected from the transmission/reception unit 1002 (No in step S83), the transmission/reception unit 2001 reports on the display 103 that generation of an electronic signature is rejected (step S86).

In the above-described exemplary embodiment, the operator of the requesting apparatus 10 sets the electronic signature level; however, the management apparatus 20 may automatically set the electronic signature level. In this modification, the requesting apparatus 10 transmits the hash value and plug-in identifier of a plug-in and a list of APIs used by the plug-in to the management apparatus 20. In this modification, upon storing information in the signature management table TB1, the management apparatus 20 obtains a list of APIs used by the plug-in from the requesting apparatus 10 and stores the obtained list in the signature management table TB1.

Figure 17:
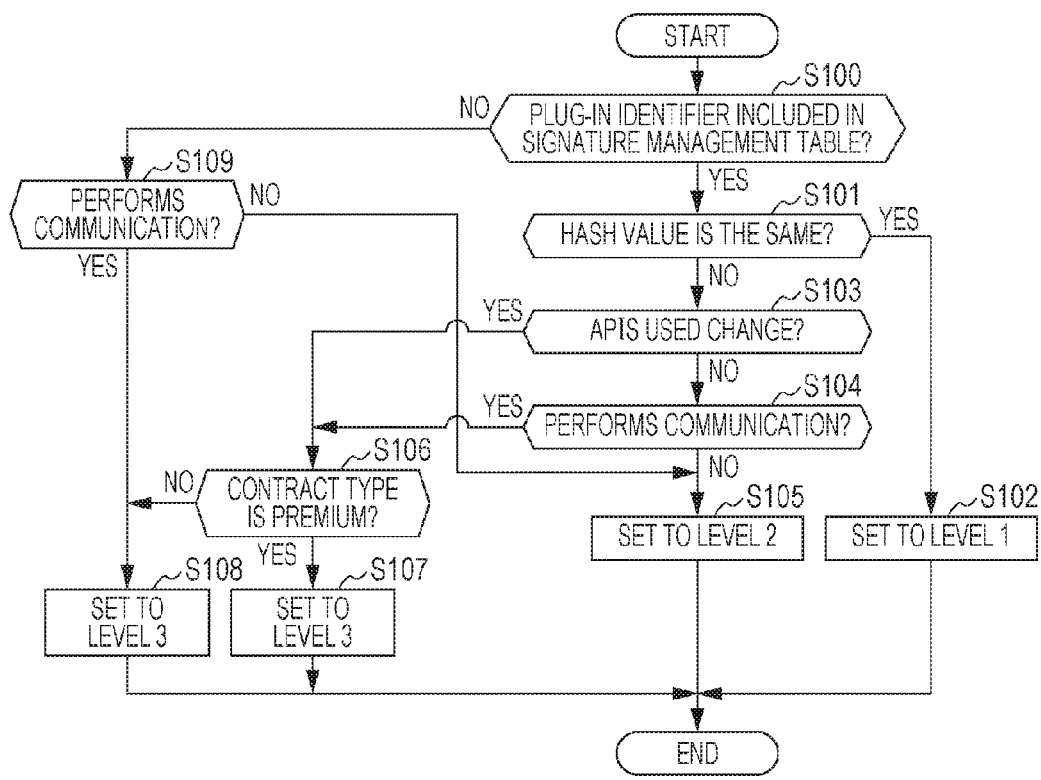
FIG. 17 is a flowchart illustrating a flow of a process performed by the other controller according to a modification.

FIG. 17 is a flowchart illustrating a flow of a process in which the management apparatus 20 automatically sets the electronic signature level. If a plug-in identifier transmitted from the requesting apparatus 10 is included in the signature management table TB1 (Yes in step S100), the controller 201 determines whether the hash value of the plug-in transmitted from the requesting apparatus 10 is the same as a hash value stored in the signature management table TB1 in association with the received plug-in (step S101). If the received hash value is the same as the hash value stored in the signature management table TB1 (Yes in step S101), the controller 201 sets the electronic signature level to level 1 (step S102). When the controller 201 determines the level and completes the process illustrated in FIG. 17, the flow proceeds to step S25, and the controller 201 generates an electronic signature.

If the received hash value is different from the hash value stored in the signature management table TB1 (No in step S101), the controller 201 compares the API list stored in the signature management table TB1 with the received API list and determines whether APIs used by the plug-in change (step S103). If APIs used by the plug-in do not change (No in step S103), the controller 201 uses the received API list and determines whether an apparatus on which the plug-in is installed performs communication via the communication line 2 (step S104). If an apparatus on which the plug-in is installed does not perform communication via the communication line 2 (No in step S104), the controller 201 sets the electronic signature level to level 2 (step S105). When the controller 201 determines the level and completes the process illustrated in FIG. 17, the controller 201 requests the requesting apparatus 10 to transmit the plug-in. When the controller 201 receives the plug-in transmitted from the requesting apparatus 10 in response to the request, the flow proceeds to step S28, and the controller 201 generates an electronic signature.

If determination in step S103 or S104 results in Yes, the controller 201 determines the type of contract with the first vendor on the basis of the developer number. In this modification, the first vendor makes a contract with the second vendor upon development of a plug-in, and the second vendor sets a contract type for the first vendor in accordance with the content of the contract. The contract type is an example of information that indicates the reliability level of the first vendor, which is a developer developing a program. For example, in a case where electronic signatures of level 1 to level 3 are generated and the second vendor evaluates a plug-in, the contract type is set to "premium". In a case where only a level-1 electronic signature is generated, the contract type is set to "basic".

If the contract type is "premium" (Yes in step S106), the controller 201 sets the electronic signature level to level 3 (step S107). When the controller 201 determines the level and completes the process illustrated in FIG. 17, the controller 201 requests the requesting apparatus 10 to transmit the plug-in. When the controller 201 receives the plug-in transmitted from the requesting apparatus 10 in response to the request, the controller 201 evaluates the received plug-in using a predetermined evaluation script. When the controller 201 completes evaluation using the evaluation script, the flow proceeds to step S35, and the controller 201 generates a level-3 electronic signature.

If the contract type is "basic" (No in step S106), the controller 201 sets the electronic signature level to level 3 (step S108). When the controller 201 determines the level and completes the process illustrated in FIG. 17, the controller 201 requests the requesting apparatus 10 to transmit the plug-in and the result of evaluation of the plug-in using an evaluation script. When the controller 201 receives the plug-in and the result of evaluation transmitted from the requesting apparatus 10 in response to the request, the flow proceeds to step S35, and the controller 201 generates a level-3 electronic signature.

If determination in step S100 results in No, the controller 201 uses the received API list and determines whether an apparatus on which the plug-in is installed performs communication via the communication line 2 (step S109). If an apparatus on which the plug-in is stalled does not perform communication via the communication line 2 (No in step S109), the flow proceeds to step S105. If determination in step S109 results in Yes, the flow proceeds to step S108.

The above-described modification is configured so that the electronic signature level is set to level 2 in a case where the plug-in does not involve communication, and is set to level 3 in a case where the plug-in involves communication; however, exemplary embodiments of the present invention are not limited to such a configuration. For example, for the image forming apparatus 30 on which a plug-in is installed, the electronic signature level may be automatically set in accordance with a function that affects security among functions used by the plug-in. Specifically, in a case where the plug-in uses a function of accessing information stored in a memory included in the image forming apparatus 30, the electronic signature level may be set to level 3.

In the above-described exemplary embodiment, the requesting apparatus 10 transmits a developer number to the management apparatus 20. After the requesting apparatus 10 has received from the management apparatus 20 a notification that use of the management apparatus 20 is permitted, the requesting apparatus 10 transmits to the management apparatus 20 various types of information for generating an electronic signature in accordance with the electronic signature level. However, various types of information for generating an electronic signature may be transmitted all together at the time of transmitting a developer number. In such a configuration, after the management apparatus 20 has permitted use of the management apparatus 20 on the basis of the developer number, the management apparatus 20 generates an electronic signature by using various types of information that have been transmitted, and transmits to the requesting apparatus 10 the generated electronic signature or the plug-in to which the generated electronic signature is added.

In the above-described exemplary embodiment, in a case where the electronic signature level is level 2 or level 3, the plug-in to which an electronic signature is added is transmitted from the management apparatus 20 to the requesting apparatus 10. However, the management apparatus 20 may transmit a generated electronic signature to the requesting apparatus 10, and the requesting apparatus 10 may add the received electronic signature to the plug-in.

In exemplary embodiments of the present invention, the image forming apparatus 30 on which a plug-in is installed may, at a timing corresponding to the level of an electronic signature added to the installed plug-in, verify the electronic signature. For example, in a case where the level of an electronic signature is level 1, the electronic signature may be verified only at the timing when the plug-in is installed. In a case where the level of an electronic signature is level 2, the electronic signature may be verified at the timing when the image forming apparatus 30 is turned on in addition to the timing in the case of level 1. In a case where the level of an electronic signature is level 3, the electronic signature may be verified when the plug-in is activated or when an external apparatus gives an instruction in addition to the timings in the case of level 2.

A program for each apparatus in exemplary embodiments of the present invention, which is stored in a computer-readable recording medium, such as a magnetic recording medium (magnetic tape, magnetic disk (hard disk drive (HDD), flexible disk (FD), or the like), an optical recording medium (optical disc or the like), a magneto-optical recording medium, a semiconductor memory, or the like, may be provided and installed. Alternatively, the program may be downloaded via a communication line and installed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first apparatus; and a second apparatus,
the first apparatus including a first hardware processor configured to execute:
a first transmission unit configured to transmit, to the second apparatus, feature information for generating an electronic signature that is added to a program, and a level of the electronic signature,
a first reception unit configured to receive the electronic signature transmitted from the second apparatus in accordance with the feature information transmitted from the first transmission unit, and the level of the electronic signature transmitted from the first transmission unit, and
a first addition unit configured to add the electronic signature received by the first reception unit to the program,
the second apparatus including a second hardware processor configured to execute:
a second reception unit configured to receive the feature information transmitted from the first transmission unit, and the level of the electronic signature transmitted from the first transmission unit,
a generation unit configured to generate the electronic signature from the feature information and the level of the electronic signature received by the second reception unit, and
a second transmission unit configured to transmit the electronic signature generated by the generation unit to the first apparatus,
wherein the generation unit is configured to, in response to the level of the electronic signature being a first level, perform a first process on the program determined in advance, the first process including a process of guaranteeing that a developer of the program is authorized, or
wherein the generation unit is configured to, in response to the level of the electronic signature being a second level, perform a second process on the program determined in advance, the second process being different from the first process, the second process including a process of guaranteeing that the program does not perform an unauthorized operation, or
wherein the generation unit is configured to, in response to the level of the electronic signature being a third level perform, a third process on the program determined in advance, the process being different from the first process and second process, the third process including a process of guaranteeing that the program satisfies predetermined quality criteria;
wherein a reliability level of the developer of the program is set in advance, and the level of the electronic signature is set in accordance with the reliability level of the developer of the program.

2. An information processing system comprising:
a first apparatus; and a second apparatus,
the first apparatus including a first hardware processor configured to execute:
a first transmission unit configured to transmit, to the second apparatus, a program, and a level of an electronic signature to be added to the program, and
a first reception unit configured to receive the program having the electronic signature added thereto transmitted from the second apparatus as a response to the program and the level of the electronic signature transmitted from the first transmission unit,
the second apparatus including a second hardware processor configured to execute:

a second reception unit configured to receive the program and the level of the electronic signature transmitted from the first transmission unit, a generation unit configured to generate the electronic signature from the program, and the level of the electronic signature receive by the second reception unit, an addition unit configured to add, in response to the generation unit generating the electronic signature from the program and the level of the electronic signature, the electronic signature to the program, and a second transmission unit configured to transmit, in response to the electronic signature being generated from the program and the level of the electronic signature, the program to which the electronic signature is added by the second addition unit to the first apparatus, wherein the generation unit is configured to, in response to the level of the electronic signature being a first level, perform a first process on the program determined in advance, the first process including a process of guaranteeing that a developer of the program is authorized, or wherein the generation unit is configured to, in response to the level of the electronic signature being a second level, perform a second process on the program determined in advance, the second process being different from the first process, the second process including a process of guaranteeing that the program does not perform an unauthorized operation, or wherein the generation unit is configured to, in response to the level of the electronic signature being a third level, perform a third process on the program determined in advance, the third process being different from the first process and the second process, the third process including a process of guaranteeing that the program satisfies predetermined quality criteria, wherein a reliability level of the developer of the program is set in advance, and the level of the electronic signature is set in accordance with the reliability level of the developer of the program.

3. The information processing system according to claim 2, wherein the generation unit is configured to change, in response to the second reception unit receiving the program, and information for identifying the program being stored, the level in accordance with whether the program has been changed.

4. The information processing system according to claim 2, wherein an apparatus having installed thereon the program to which the electronic signature is added is configured to verify the electronic signature at a timing determined in advance in accordance with the level of the electronic signature.

5. An information processing method comprising:

transmitting, from a first apparatus to a second apparatus, feature information for generating an electronic signature that is added to a program, and a level of the electronic signature;

receiving, at the second apparatus, the feature information transmitted from the first apparatus, and the level of the electronic signature transmitted from the first transmission unit;

generating, in the second apparatus, the electronic signature from the feature information received from the first apparatus;

transmitting, from the second apparatus to the first apparatus, the generated electronic signature;

receiving, at the first apparatus, the electronic signature transmitted from the second apparatus; and adding, in the first apparatus, the received electronic signature to the program, wherein the generating comprises:

performing, in response to the level of the electronic signature being a first level, a first process on the program determined in advance, the first process including a process of guaranteeing that a developer of the program is authorized, or performing, in response to the level of the electronic signature being a second level, a second process on the program determined in advance, the second process being different from the first process, the second process including a process of guaranteeing that the program does not perform an unauthorized operation, or performing, in response to the level of the electronic signature being a third level, a third process on the program determined in advance, the third process being different from the first process and the second process, the third process including a process of guaranteeing that the program satisfies predetermined quality criteria, wherein a reliability level of the developer of the program is set in advance, and the level of the electronic signature is set in accordance with the reliability level of the developer of the program level of the developer of the program.

* * * * *